United States Patent [19]
Niethammer et al.

[11] Patent Number: 5,711,038
[45] Date of Patent: Jan. 27, 1998

[54] TOILET SYSTEM

[75] Inventors: Michael Niethammer; Karl Schäfer, both of Gernsheim, Germany

[73] Assignee: Niethammer GmbH, Gernsheim, Germany

[21] Appl. No.: 507,322

[22] PCT Filed: Mar. 7, 1994

[86] PCT No.: PCT/EP94/00678

§ 371 Date: Oct. 24, 1995

§ 102(e) Date: Oct. 24, 1995

[87] PCT Pub. No.: WO94/20347

PCT Pub. Date: Sep. 15, 1994

[30] Foreign Application Priority Data

Mar. 6, 1993 [DE] Germany .................. 43 07 102.3

[51] Int. Cl.$^6$ ........................................ E03D 5/016
[52] U.S. Cl. ........................... 4/317; 4/321; 4/340
[58] Field of Search .......................... 4/317, 318, 321, 4/323, 340, 341, 342

[56] References Cited

U.S. PATENT DOCUMENTS

| | | | |
|---|---|---|---|
| 3,922,730 | 12/1975 | Kemper | 4/317 |
| 4,017,395 | 4/1977 | Davis | 4/317 |
| 4,063,315 | 12/1977 | Carolan et al. | 4/317 |
| 4,115,876 | 9/1978 | Cole, Jr. et al. | 4/317 |
| 4,213,864 | 7/1980 | Asikainen | 4/318 |
| 4,871,452 | 10/1989 | Kohler et al. | |
| 5,010,602 | 4/1991 | Sargent et al. | 4/321 |

FOREIGN PATENT DOCUMENTS

| | | |
|---|---|---|
| 298199 | 1/1989 | European Pat. Off. |
| 4123803 | 1/1993 | Germany |

OTHER PUBLICATIONS

Brochure from Protec, Partner für Umwelttechnik GmbH entitled "Innovationen für die Zukunft" (undated).

Primary Examiner—David J. Walczak
Attorney, Agent, or Firm—Leydig, Voit & Mayer Ltd.

[57] ABSTRACT

A toilet system comprising a toilet including a flushing device and a toilet bowl, further comprising a faecal tank for receiving sewage from the toilet, the faecal tank including a separating device for separating liquid and solid components of the sewage, and the liquid components being withdrawable as grey water from the separating device through a first outlet, and further comprising a hygienization tank receiving the grey water separated off in the faecal tank through a grey water inlet and including a device for hygienizing the grey water which is then withdrawable as hygienized grey water from a second outlet is proposed. Owing to the toilet system comprising a recirculating device with a recirculating pump and a return pipe, with the recirculating device connecting the second outlet with the grey water side of the hygienization tank, and the recirculating device being connected to the flushing device and, as required, supplying the flushing device with amounts of the hygienized grey water as flushing liquid, the toilet system makes do with considerably reduced amounts of fresh water.

11 Claims, 10 Drawing Sheets

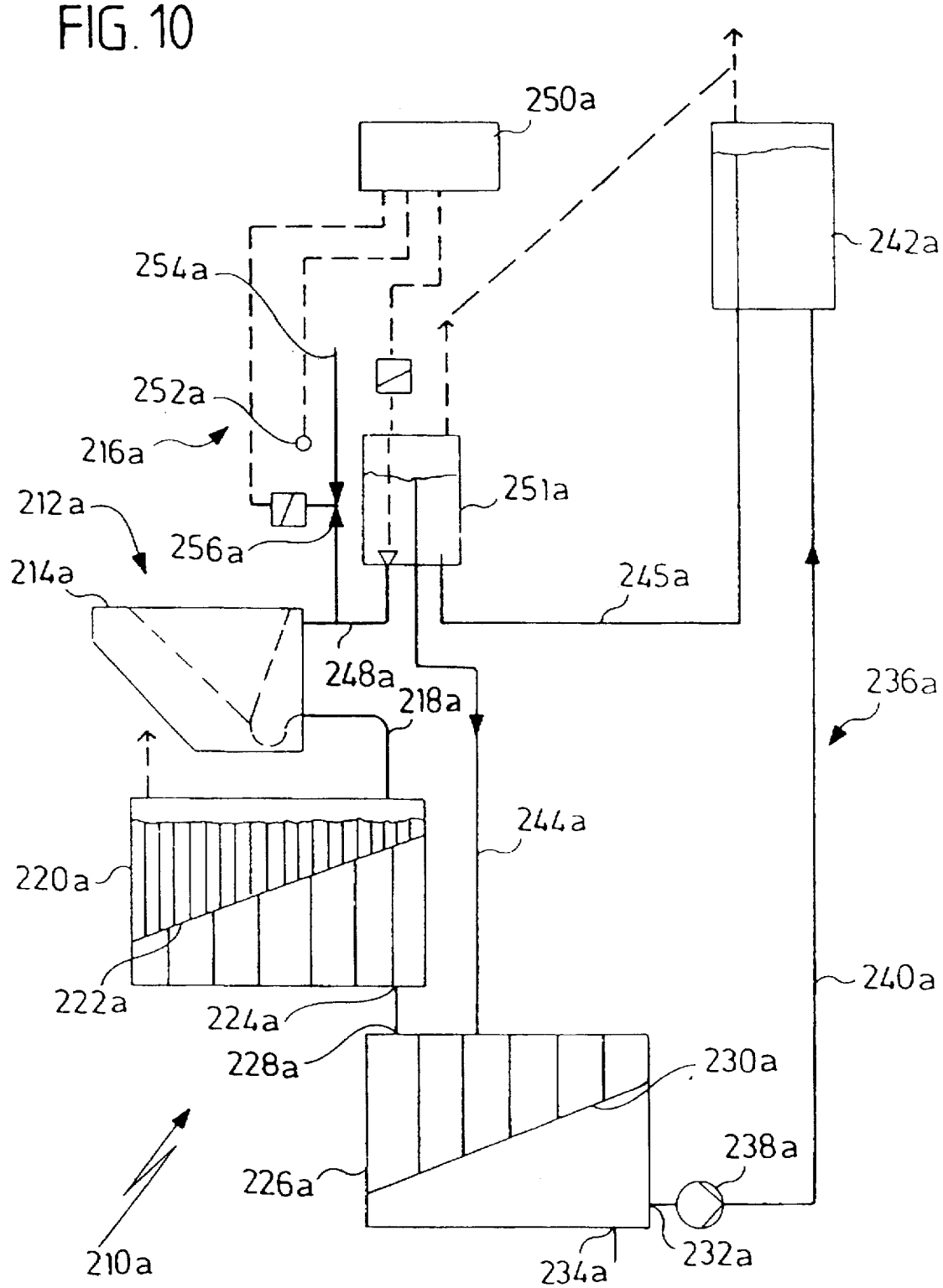

TOILET SYSTEM

The invention relates to a toilet system, in particular, for rail-bound vehicles, airplanes, coaches or the like, for mobile use. The invention relates, in particular, to a toilet system comprising a toilet including a flushing device and a toilet bowl, further comprising a faecal tank for receiving sewage from the toilet, the faecal tank including a separating device for separating liquid and solid components of the sewage, and the liquid components being withdrawable as grey water from the separating device through a first outlet, and further comprising a hygienization tank receiving the grey water separated off in the faecal tank through a grey water inlet and including a device for hygienizing the grey water which is then withdrawable as hygienized grey water from a second outlet.

Such toilet systems are known, for example, from the firm of Protec, Partner fuer Umwelttechnik GmbH as so-called biotoilets. The way in which they operate will be described briefly hereinbelow.

With the aforementioned biotoilets, the faeces are conveyed together with the flushing liquid into the faecal tank which acts as treatment tank and bioreactor. The faecal tank is lined in both the bottom and side areas with a specially coated carrier material through whose pores the liquids can run off freely, while the solids are retained on the carrier material.

Organisms and bacteria in the human faeces concentrate therein and cause decomposition of the faeces. Odors released during this are directed into the open by means of tank ventilation. The liquids enter as grey water a hygienization tank comprising a device for hygienizing the grey water. During hygienization, in particular, a reduction in the germ count is achieved. This makes the thus hygienized grey water ecologically perfectly safe and so it can be released into the environment.

After only two weeks the solids retained in the faecal tank have been reduced to approximately 50% of their original volume by biological decomposition processes and are reduced thereafter by a further 5% daily.

In addition to offering independence from municipal sewage purification plants and absolute ecological safety, the advantages of this biological toilet system are to be seen in the fact that the contents of the faecal tank only have to be emptied infrequently owing to the reduction in volume of the solids. Also, the carrier material is designed so that it will continue to operate over a long number of years. The treatment or faecal tank only has to be rinsed with normal water once a year. This treatment is sufficient to guarantee permeability of the carrier material to an adequate extent, and no further maintenance is required. The disadvantages of these toilet systems are that, on the one hand, they require larger amounts of fresh water for flushing the toilet bowl and, on the other hand, they release hygienized grey water to the environment.

The need for a larger storage tank for fresh water and the necessity of releasing hygienized grey water to the environment restrict use of this toilet system in a whole series of cases.

A toilet system for coaches is known from German Utility Model G 91 16 209 wherein a reduction of the volume of flushing liquid to be taken along is achieved by the possibility of switching over alternatively between fresh water flushing and flushing with recirculating chemical agents.

Disadvantages of this kind of flushing are, in particular, the use of chemicals for hygienizing the sewage in its entirety, i.e., without separating off the solids, and the necessity of having to take along chemical solutions. Disposal of the chemical flushing liquid also poses problems.

Furthermore, in order to minimize an additional drinking water load in airplanes, it is known from EP-A-298 199 to reuse processed waste water for flushing the toilet.

The object of the present invention is to so improve a toilet system of the kind described at the outset that it makes do with considerably reduced amounts of fresh water.

This object is accomplished in accordance with the invention by the toilet system comprising a recirculating device with a recirculating pump and a return pipe, with the recirculating device connecting the second outlet with the grey water side of the hygienization tank, and by the recirculating device being connected to the flushing device and, as required, supplying the flushing device with amounts of the hygienized grey water as flushing liquid.

The toilet systems according to the invention are suited, in particular, for installation in modern rail-bound vehicles, etc.

In a preferred embodiment of the invention the flushing device is designed to include a device for pulsing delivery of the flushing liquid to the toilet bowl, with equally effective cleaning of the toilet bowl being achievable with reduced amounts of flushing liquid.

In a further preferred toilet system, the flushing device is, furthermore, designed such that the flushing liquid is delivered to the toilet bowl in several flushing phases, with provision being made for at least one main flushing phase for removing the faeces and one reflushing phase. In this embodiment of the invention, it is, in particular, expedient to use hygienized grey water as flushing liquid for the main flushing phase or the first flushing phase and to use fresh water in a subsequent phase so that the overall flushing effect corresponds fully to the results obtained with fresh water flushing, but only a fraction of the fresh water normally required so far is needed.

A volume of flushing liquid of approximately 6 liters is, for example, required for a normal flushing operation. With division into two flushing phases, the major part of this flushing liquid can be taken from the supply of hygienized grey water, and for the subsequent flushing phase a volume of approximately 0.5 to 1 liter of fresh water is fully adequate to provide conditions in the toilet system corresponding to those which prevail with the known flushing with fresh water.

These toilet systems according to the invention are on a complete par with the recently propagated vacuum toilets and, in addition, are operationally safer owing to the simpler principle by which they operate and the considerably lower fresh water consumption.

It is preferable for the flushing device to be equipped with an electronic control means for controlling the delivery of the flushing liquid in different flushing phases or the pulses of the flushing liquid and/or the use of different flushing liquids in the different flushing phases.

The electronic control means can also be equipped with sensors for testing the levels of the individual tanks. When the maximum levels are reached, it is conceivable for a control element for blocking the door which provides access to the toilet system to be automatically actuated by the electronic control means. Similarly, the blocking of the door which provides access to the toilet system can be triggered when a fault occurs in the recirculating device, should, for example, the recirculating pump break down.

Alternatively, a mechanical control device can, of course, also be used for controlling the different flushing operations.

In connection with use of an electronic control means, it is, in particular, expedient for the recirculating device to comprise a multi-way valve arrangement which is arranged downstream from the recirculating pump and through which the hygienized grey water required for flushing can be taken from the recirculating device. When flushing liquid is requested, the electronic control means will then interrupt the circuit of the hygienized grey water from the hygienization tank through the recirculating device back to the grey water side and briefly supply part of the hygienized grey water to the flushing device. The circuit for the hygienized grey water will then be closed again.

The recirculating pump for the hygienized grey water is often of such dimensions that it provides sufficient pressure for the flushing of the toilet bowl. In this event, it is fully adequate for the flushing liquid, in this case hygienized grey water, to be supplied to the flushing device of the toilet with the pressure made available by the recirculating pump.

As an alternative to the multi-way valve solution, provision may be made for the recirculating device to comprise a pipe branching downstream from the recirculating pump, with a first branch being connected to the grey water side of the hygienization tank and a second branch to the flushing device. If the capacity of the recirculating pump is adequate for the flushing pressure, it is enough to provide at the end of the second branch of the pipe branching a closed valve which is opened when there is a request for flushing liquid. If the recirculating pump of the recirculating device has a lower capacity, provision may be made for one branch of the pipe branching to lead to a hydrostatic pressure accumulator comprising a storage tank which has an inlet for the return pipe, an outlet connected to the grey water side of the hygienization tank and an outlet connected to the flushing device. With a relatively low pumping capacity, the storage tank can then be filled and the flushing operation carried out by means of the hydrostatic pressure, as is customary with flushing devices with a flush box. The pipe leading back to the grey water side is preferably filled by an overflow in the storage tank which can simultaneously serve as flush box. A system of this kind is very reasonably priced and easy to maintain since only the flush box valve is necessary to realize all of the operating states of the toilet system.

In a preferred embodiment, provision is made for the flushing device to include in addition to the storage tank a flush box which is then connected to the outlet for the flushing liquid of the storage tank.

In a particularly preferred toilet system, provision is made for the flushing liquid to be conveyed essentially in a closed circuit from which solids are discharged, if and as required, after separation from the faecal tank.

Irrespective of the particular embodiment of the invention, it is important for the implementation of the recirculating device with its recirculating capacity to be such that the hygienized grey water is completely recirculated at sufficiently short time intervals so that the germ count in the hygienized grey water remains below a specified value.

These and further advantages of the invention are explained in further detail in the following with reference to the drawings, in which:

FIG. 10 is a diagrammatic representation of the toilet system according to FIG. 9 with a supply of fresh water.

Figure 1:
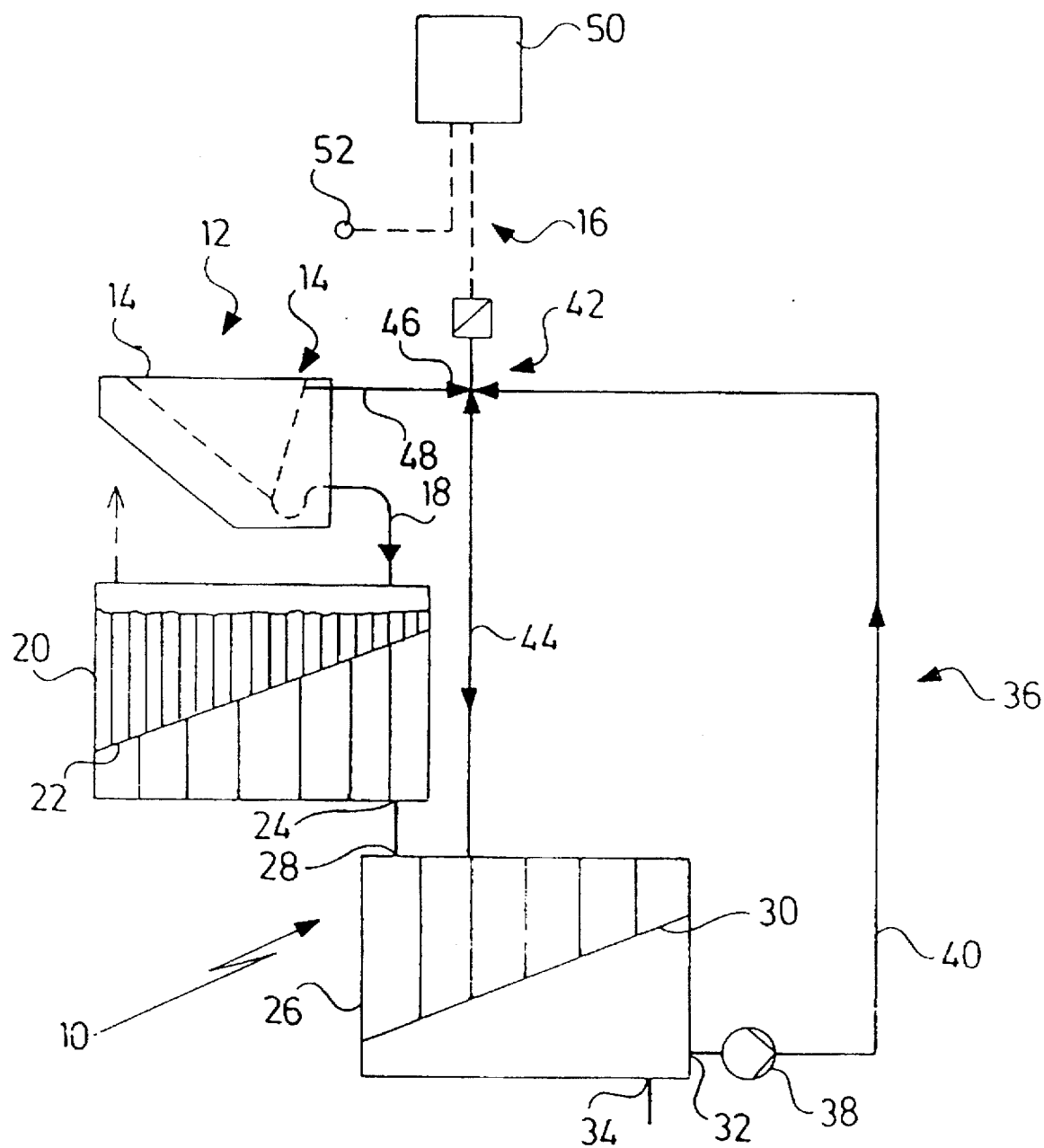
FIG. 1 is a diagrammatic representation of the toilet system according to the invention.

FIG. 1 shows a diagrammatic representation of a toilet system designated in its entirety by the reference numeral 10. The toilet system 10 comprises a toilet 12 with a toilet bowl 14 and a flushing device 16.

The toilet bowl 14 is connected through a sewage pipe 18 for conveying the flushing liquid containing faeces to a faecal tank 20 in which solid and liquid components of the sewage are separated in a known manner. The separating device 22 required for this is indicated only diagrammatically.

In general, any suitable separating device, in particular, the one described at the outset, can be used for this purpose.

The liquid components of the sewage are conducted as grey water through a first outlet 24 to a hygienization tank 26 which is connected through a grey water inlet 28 to the first outlet 24 of the faecal tank 20.

The hygienization tank 26 comprises a hygienization device 30 which can, for example, be a micropore filter for retaining germs contained in the grey water and allowing essentially germ-free, hygienized grey water to pass through and become available at a second outlet 32 of the hygienization tank 26. There is usually provided on the side of the hygienized grey water of the hygienization tank 26 a further outlet 34 through which the hygienization tank 26 can be drained.

A recirculating device 36 comprising a recirculating pump 38 and a return pipe 40 leads from the second outlet 32 to an electronically actuatable multi-way valve 42 which is connected, on the one hand, to the return pipe 40 and, on the other hand, through a pipe section 44 to the grey water side of the hygienization tank 26 again. A further connection 46 is connected to the flushing device 16 of the toilet 12 and provides it with hygienized grey water as flushing liquid for the flushing operation. In addition to a pipe 48 for conducting flushing water, the flushing device 16 comprises an electronic control means 50 for switching, after actuation of a switch or button 52, the multi-way valve 42 over to delivery of flushing liquid to the flushing device 16 through the pipe 48. In the absence of a request through the switch 52, the electronic control means 50 controls the valve position of the multi-way valve 42 such that a circuit is created for the hygienized grey water from the hygienization tank 26 and its outlet 32 through the recirculating pump 38, the return pipe 40 and the pipe section 44. This is important because the hygienized grey water can be recirculated either continually or at specified time intervals between the flushing operations and thereby pass through the hygienization device 30 again so as to ensure that the hygienized grey water provided as flushing liquid only contains a germ count which lies below a specified value and is, therefore, absolutely safe from a hygienic point of view for the given purpose.

In the given example, the pumping capacity of the recirculating pump 38 is large enough for the pressure generated by the recirculating pump 38 to be fully adequate for the flushing operation of the flushing device 16. This means that after switching over the multi-way valve 42 through which the return pipe 40 is connected through the outlet 46 of the multi-way valve 42 to the pipe 48, an adequate water pressure is available for flushing the toilet bowl 14. The electronic control means 50 can be designed so as to deliver the flushing liquid in several pulses of the flushing device 16 so the cleaning of the toilet bowl 14 is carried out with proportioned amounts of water. This serves to minimize use of flushing liquid. The returned flushing liquid, i.e., in this case hygienized grey water, travels with the faeces picked up during the flushing operation through the sewage pipe 18 into the faecal tank 20 where, again, the solids are separated off by the separating device 22. The thus produced grey water travels as liquid component of the sewage through the outlet 24 and the grey water inlet 28 to the hygienization tank 26 where the grey water is again converted by the hygienization device 30 into hygienized grey water of unchanged hygienic quality which is then available for a new flushing operation.

Figure 2:
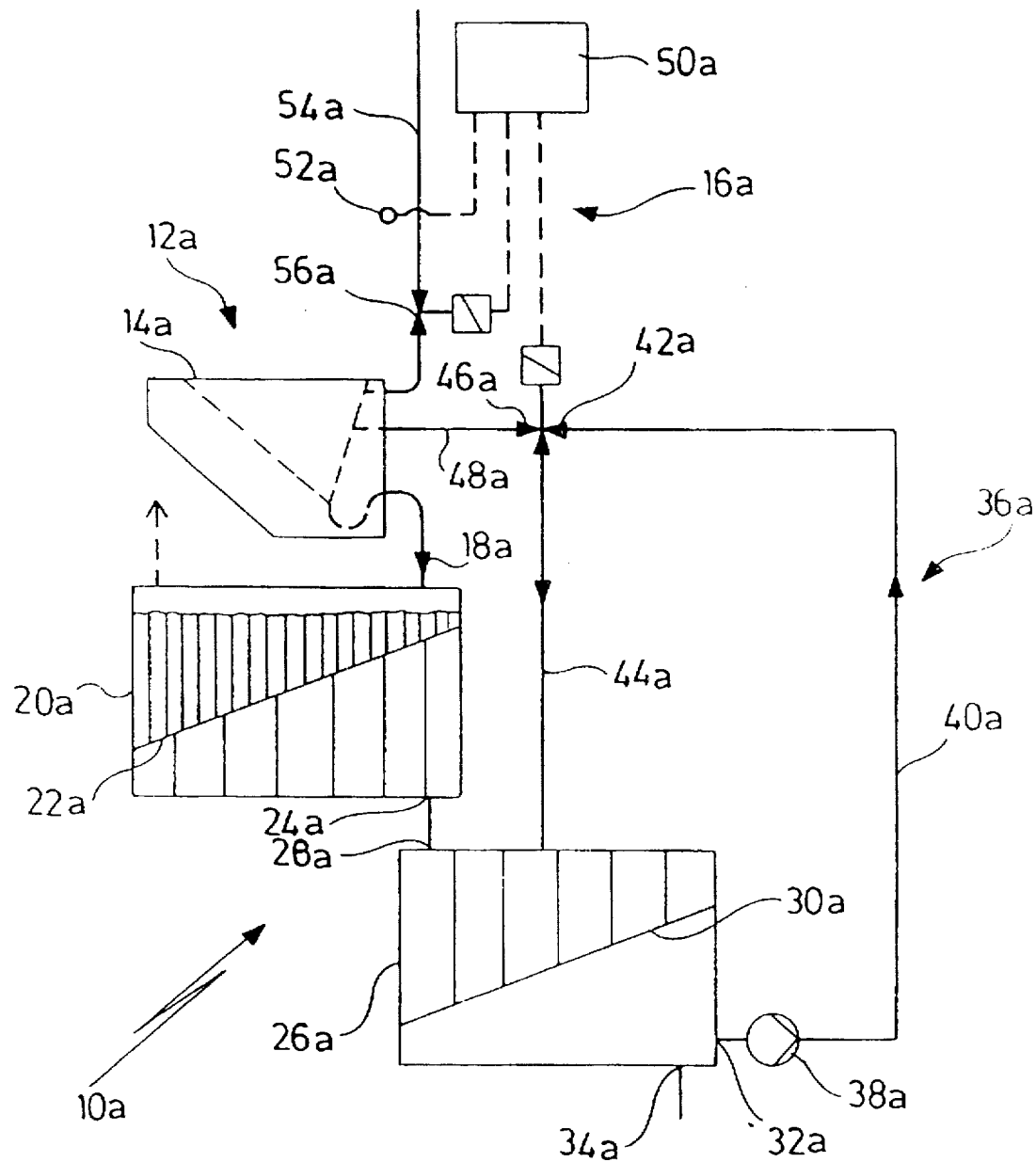
FIG. 2 is a diagrammatic representation of the toilet system according to the invention with a supply of fresh water.

FIG. 2 shows a variant of the embodiment of the invention as shown in FIG. 1 and described hereinabove. The toilet system designated therein in its entirety by reference numeral 10a differs from the toilet system 10 of FIG. 1 described hereinabove in that this toilet system 10a is connected through a further pipe 54a to a supply of fresh water (not shown). There is arranged in the fresh water pipe 54a an electronically actuatable valve 56a which is actuated from an electronic control means 50a after a request has been made with a switch 52a. In this embodiment of the invention, provision is made for flushing liquid to be delivered from the return pipe 40a in the form of hygienized grey water to the flushing device 16a so that in a first flushing phase as main flushing operation, the faeces are substantially removed from the toilet bowl 14a and conveyed through the pipe 18a to the faecal tank 20a. In a reflushing phase, fresh water is supplied briefly through the pipe 54a and the valve 56a to the flushing device 16a. With this flushing pulse the remainder of the hygienized grey water is washed off the surface of the toilet bowl, thereby creating a state such as that established by normal flushing with fresh water. In comparison with the fresh water flushings in the prior art, the fresh water consumption in this embodiment is drastically reduced as a fresh water volume of approximately 0.5 to 1 liter is usually adequate for this reflushing operation.

The hygienization tank 26a of this embodiment preferably has larger dimensions than that of the embodiment of FIG. 1, i.e., the hygienization tank 26, as a possibility has to be provided for storing the volume of fresh water used additionally in the reflushing operation. Of course, the fresh water tank that is not illustrated is needed here in addition, but its dimensions can be considerably smaller than those of conventional fresh water flushing devices without the frequency of use or the number of possible uses of the toilet being thereby reduced. Furthermore, in comparison with the prior art, this embodiment has the advantage that even in the event that the fresh water for the reflushing operation has been completely used up, it is possible to switch over to the mode of operation which applies to the embodiment in FIG. 1. Here it is possible for the electronic control means 50a to comprise a sensor for checking the level in the fresh water tank that is not shown and, in the event of the supply of fresh water being exhausted, switching the mode of operation over to the mode of operation described in conjunction with FIG. 1.

Figure 3:
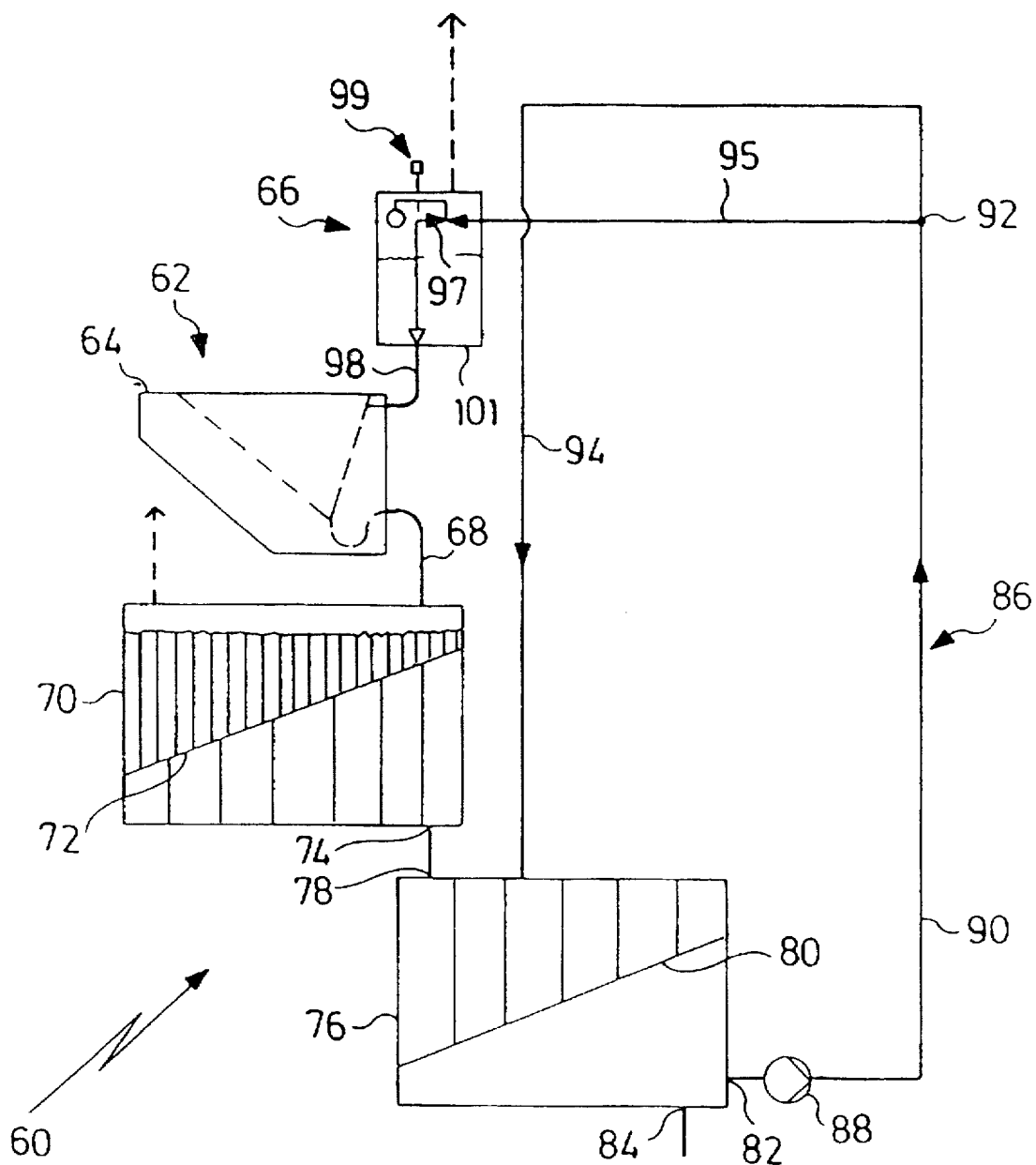
FIG. 3 is a diagrammatic representation of a variant of the toilet system according to the invention that recirculates hygienized grey water without the use of a multi-way valve.

FIG. 3 shows a toilet system according to the present invention designated in its entirety 60 and comprising a toilet 62 with a toilet bowl 64 and a flushing device 66 connected through a sewage pipe 68 to a faecal tank 70. A separating device 72 provided in the faecal tank 70 separates the sewage into its liquid and solid components. The liquid components are conducted as grey water through the first outlet 74 to the hygienization tank 76 and its grey water inlet 78 where the grey water is converted by the hygienization device 80 into hygienized grey water. The hygienized grey water is available to a recirculating device 86 at the second outlet 82. In addition to the second outlet 82, the hygienization tank 76 has a further outlet 84 which is used for draining the hygienization tank 76 when maintenance work is being carried out.

The recirculating device 86 comprises a recirculating pump 88 and a return pipe 90 which forks at a pipe branching 92 and leads with a first branch 94 back to the hygienization tank on its grey water side, while a second branch 95 leads to the flushing device 66. It is important that the first branch 94 should offer the grey water a higher flow resistance than the second branch 94.

The second branch 95 is closed at its end leading into the flushing device 66 by a valve 97. The valve 97 which is closed in the normal state is opened through an actuating device 99 which can operate mechanically or electrically, and the hygienized grey water is made available to the flushing device 66 as flushing liquid through the pipe 95. In the event that the recirculating pump 88 has sufficient capacity, the flushing of the toilet bowl 64 can be carried out in the same way as described hereinabove in conjunction with FIGS. 1 and 2. If the liquid pressure built up by the recirculating pump 88 is not adequate for the flushing method described in conjunction with FIGS. 1 and 2, provision may be made for the flushing device 66 to comprise a storage tank 101 which, after actuation of the actuating device 99, delivers a surge of flushing liquid to the toilet 62 through a pipe 98.

Figure 4:
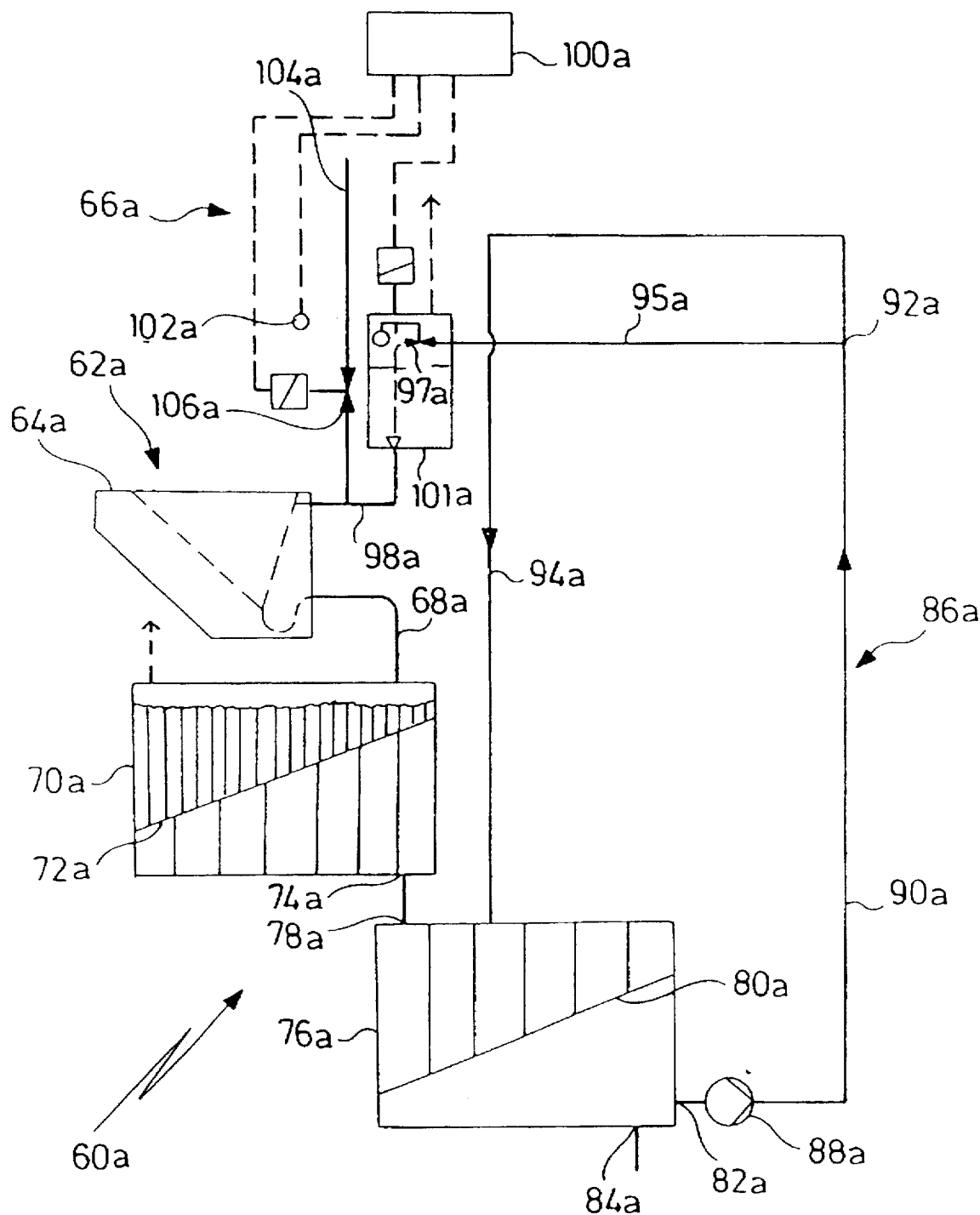
FIG. 4 is a diagrammatic representation of a variant of the toilet system according to FIG. 3 with a supply of fresh water.

The details of the toilet system 60a illustrated in FIG. 4 correspond to a great extent to those of FIG. 3, and identical parts have the same reference numerals as well as the suffix "a". Since these have the same function and there is no difference in the arrangement, the following description will be limited to the differences between the systems of FIGS. 3 and 4.

In addition to the toilet system as shown in FIG. 3, the toilet system 60a comprises a fresh water connection which is formed by a pipe 104a and a valve 106a. The flushing device 66a comprises an electronic control means 100a which controls both the flushing operation with flushing liquid in the form of hygienized grey water obtained from the recirculating device 86a through a branch pipe 85a and the subsequent flushing phase with fresh water.

The remarks made in the description of FIGS. 1 to 3 apply in the same way to the operation of the toilet system 60a; with regard to control of the fresh water supply or the inflow of flushing water, the statements on the toilet system 10a shown in FIG. 2 apply accordingly.

Figure 5:
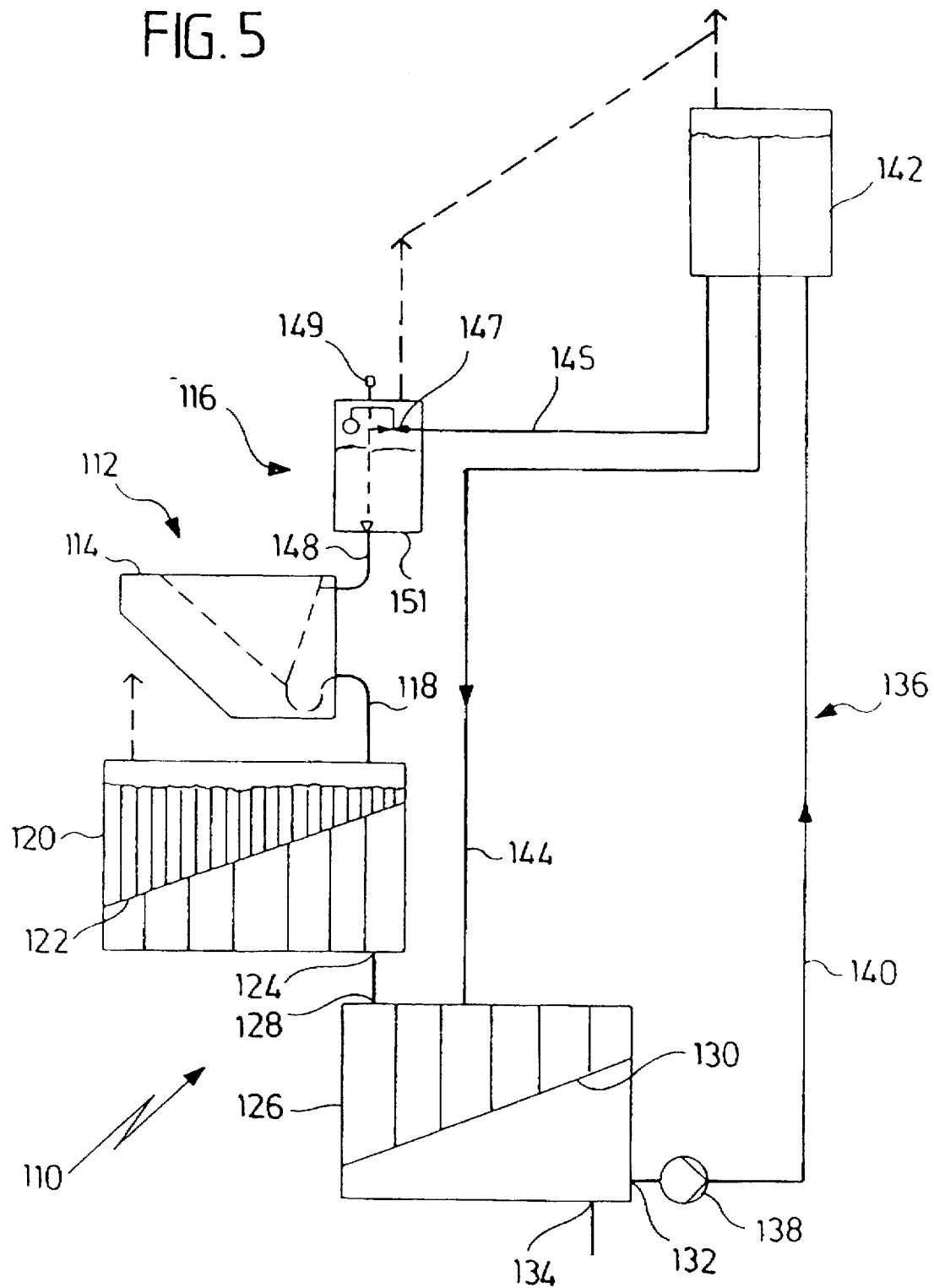
FIG. 5 is a diagrammatic representation of a variant of the toilet system according to the invention in which the recirculated hygienized grey water is routed through a storage tank, and the hygienized grey water recirculates independent of the flushing action only if the water level in the tank is at a predetermined level.

FIG. 5 shows a further embodiment of the present invention wherein a toilet system 110 comprises a toilet 112 with a toilet bowl 114 and a flushing device 116. A sewage pipe leads from the toilet bowl 114 to a faecal tank 120 containing a separating device 122 in which liquid and solid components of the sewage 118 are separated from one another and grey water is made available by it at a first outlet 124 of the faecal tank 120.

The grey water is conducted from the first outlet 124 through a grey water inlet 128 to a hygienization tank 126 which, for its part, contains a hygienization device 130 in which germs are removed from the grey water so that hygienized grey water is available at a second outlet 132. The hygienization tank 126 has a further outlet with a drainage pipe 134 through which the hygienization tank 126 can be drained for maintenance work.

A recirculating device 136 connected to the second outlet 132 comprises a recirculating pump 138 and a return pipe 140 through which hygienized grey water is received from the second outlet 132 and delivered through a pipe section 144 to the hygienization tank 126 again, but on its grey water side. As needed, the hygienized grey water can thus be recirculated continually or at certain time intervals so as to ensure in the necessary way that the hygienized grey water remains free of germs.

The return pipe 140 first leads into a tank 142 in which a certain volume of hygienized grey water is stored for flushing purposes. The storage tank 142 is connected through a further pipe 145 to the flushing device 116 and fills a flush box 151 in the flushing device through a valve 147.

The simplest way of ensuring that there is always a sufficient amount of flushing liquid available in the storage tank 142, even if the recirculating pump 138 has only an extremely low pumping capacity, is for the pipe section 144 conducting the hygienized grey water to the grey water side of the hygienization tank 126 again to protrude into the storage tank 142 and end at a height which corresponds to the specifically desired normal level of the storage tank 142. Hence, only if the storage tank 142 has reached its set level, is the hygienized grey water that is further conveyed by the recirculating pump 138 fed through a simple overflow to the pipe section 144 and recirculated.

In the event of actuation of an actuating device 149 which can be controlled mechanically, electrically or electronically, a surge of flushing liquid is delivered to the toilet bowl 114 from the flush box 151. The valve 147 is then opened, for example, by means of a float regulator until the flush box 151 is filled to its set level again through the pipe 145 and the valve 147.

An alternative embodiment of this is shown in FIG. 6, wherein, again, identical components of the toilet system 110a are given the same reference numerals as in FIG. 5, but with the suffix "a". A detailed description of the toilet system 110a will be dispensed with herein as that of FIG. 5 applies accordingly. Therefore, in the following reference will only be made to the differences from the toilet system 110 shown in FIG. 5.

These differences consist essentially in that the toilet system 110a communicates with a supply of fresh water through a pipe 154a and a valve 156a. Therefore, the two-phase flushing described in conjunction with FIGS. 2 and 4 can also be realized in this embodiment. The two-phase flushing is controlled by an electronic control means 150a which, on the one hand, triggers the main flushing operation by opening the valve in the flush box 151a, from which a surge of flushing liquid, i.e., hygienized grey water, is delivered through the pipe 148a to the toilet bowl 114a, and after this main flushing operation, reflushing is carried out with fresh water from the fresh water pipe 154a.

The time sequence after a flushing operation has been requested through a switch 152a is the same as described in conjunction with FIGS. 2 and 4. An embodiment shown in FIGS. 7 and 8 which is somewhat simpler than this one comprises a toilet system 160 and 160a, respectively, wherein a toilet 162 with a toilet bowl 164 and a flushing device 166 is connected through a pipe 168 to a faecal tank 170.

A separating device 172 provided in the faecal tank 170 for separating liquid and solid components of the sewage received through the pipe 168 makes the grey water available as liquid component of the sewage at a first outlet 174. From the first outlet 174 the grey water travels to the hygienization tank 176 through the grey water inlet 178 thereof.

A hygienization device 180 arranged in the hygienization tank 176 converts grey water into hygienized grey water having a germ count that is permissible from a hygienic standpoint.

On the outlet side, the hygienized grey water is made available at the outlet 162 of a recirculating device 186 comprising a recirculating pump 188 and a return pipe 190.

The hygienization tank 176 also comprises a further outlet 184 having a drainage pipe connected to it.

The return pipe 190 of the recirculating device 186 leads to a storage tank 192 in which the hygienized grey water is stored up to a specified level.

By means of an actuating device 199, the hygienized grey water needed for a flushing operation can be delivered in surges from the storage tank 192 through a pipe 198 to the toilet bowl 164.

The storage tank 192 leads back through an overflow determining the maximum level of the storage tank through a pipe section 194 to the grey water side of the hygienization tank 176. The processing of the flushing liquid consisting of hygienized grey water which is supplied as sewage after the flushing operation through the pipe 168 to the faecal tank 170 is carried out as described hereinabove.

Figure 7:
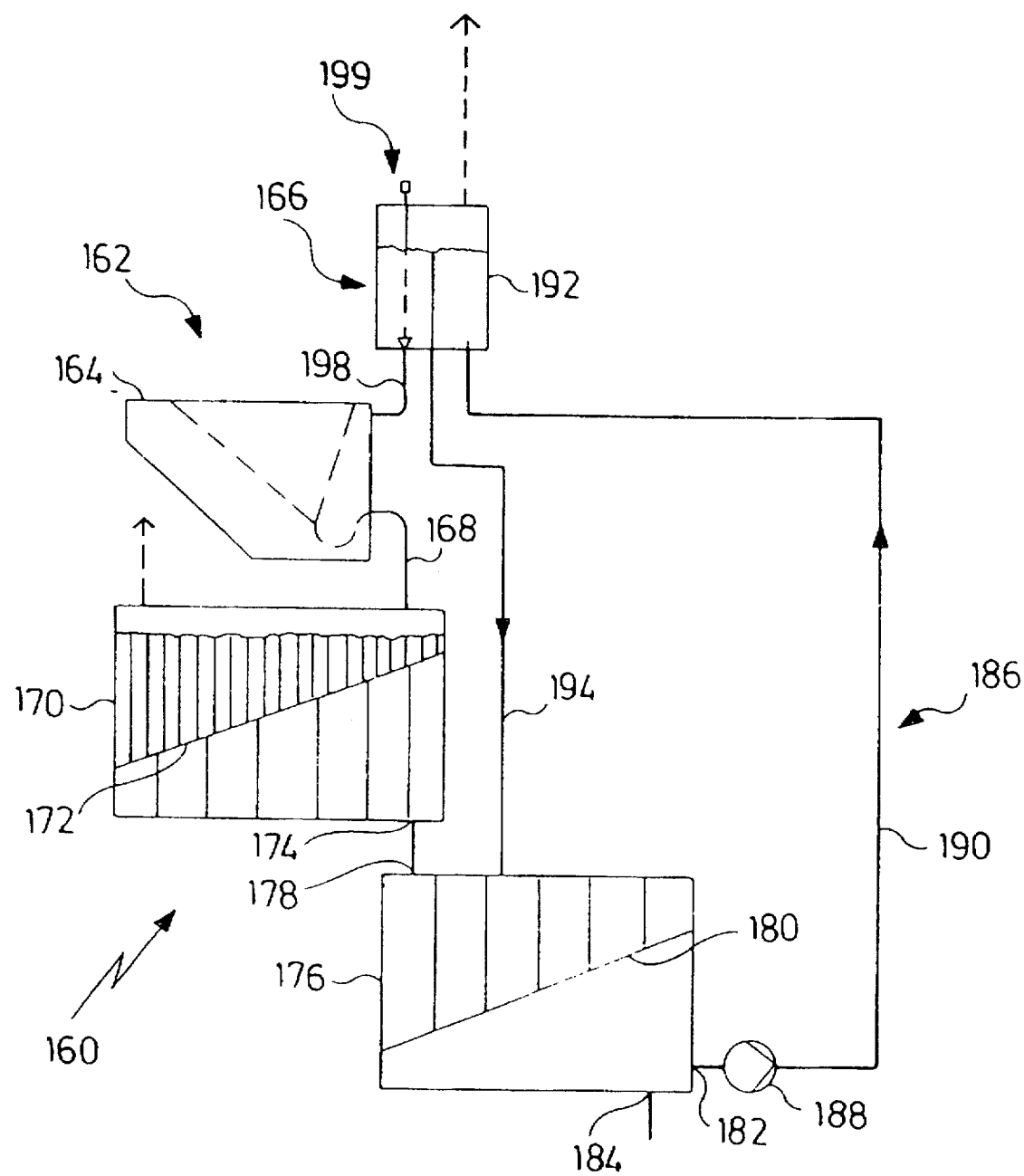
FIG. 7 is a diagrammatic representation of the toilet system according to FIG. 5 in which the storage tank delivers the water for the flushing action in multiple surges.

A modification of the embodiment shown in FIG. 7 is, as mentioned hereinabove, illustrated in FIG. 8 in the form of a toilet system 160a. The statements made in conjunction with FIG. 7 apply to the description of this toilet system, with identical components of the toilet systems having the same reference numerals, but with the suffix "a".

Only the differences between the two toilet systems 160 and 160a will be referred to in the following.

Figure 6:
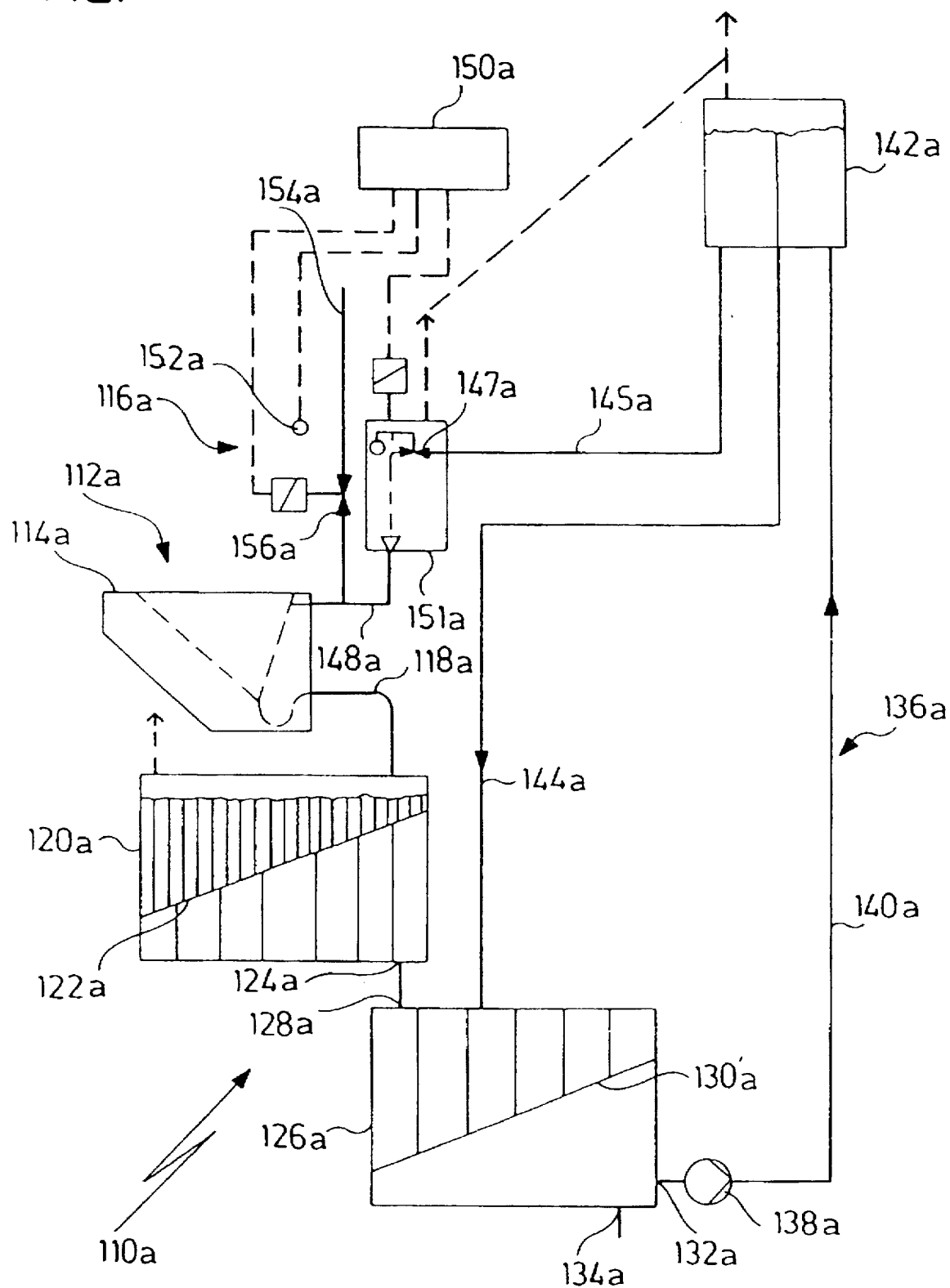
FIG. 6 is a diagrammatic representation of the toilet system according to FIG. 5 with a supply of fresh water.

In the toilet system 160a shown in FIG. 8, the major difference to the embodiment according to FIG. 7 is that it is connected through a pipe 204a to a supply of fresh water (not shown) which, as described hereinabove in conjunction with FIGS. 2, 4 and 6, is used in a second flushing phase after the main flushing phase in which hygienized grey water was used. After actuation of a trigger switch 202a, an electronic control means 200a first delivers a surge of flushing water to the toilet bowl 164a from the storage tank 192a through the pipe 198a. Immediately afterwards fresh water for the second flushing phase is supplied to the toilet bowl 164a through the pipe 204a and a valve 206a which is likewise activated by the electronic control means 200a. The results, as described hereinabove in conjunction with FIGS. 2, 4 and 6, are such that in spite of the clear saving in fresh water, the same state is established as had a complete flushing with fresh water taken place.

In accordance with the increase in the volume of the hygienized grey water in the course of use of the toilet system 160a, the dimensions of the hygienization tank 176a will be correspondingly large.

With this embodiment, too, in the event the supply of fresh water is exhausted, the electronic control means 200a can switch over completely to the mode of operation which applies to the toilet system 170 according to FIG. 7.

Figure 8:
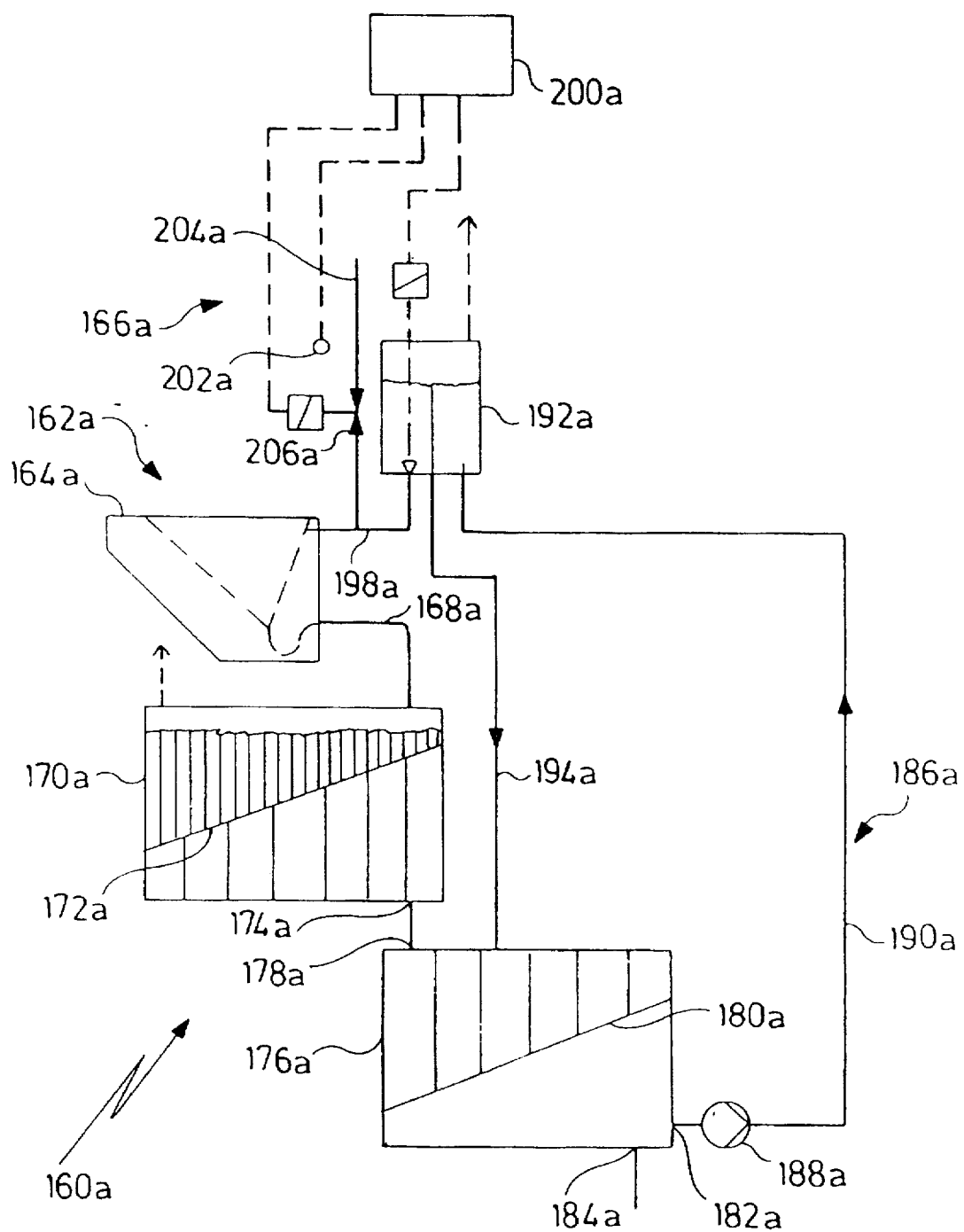
FIG. 8 is a diagrammatic representation of the toilet system according to FIG. 7 with a supply of fresh water.
Figure 9:
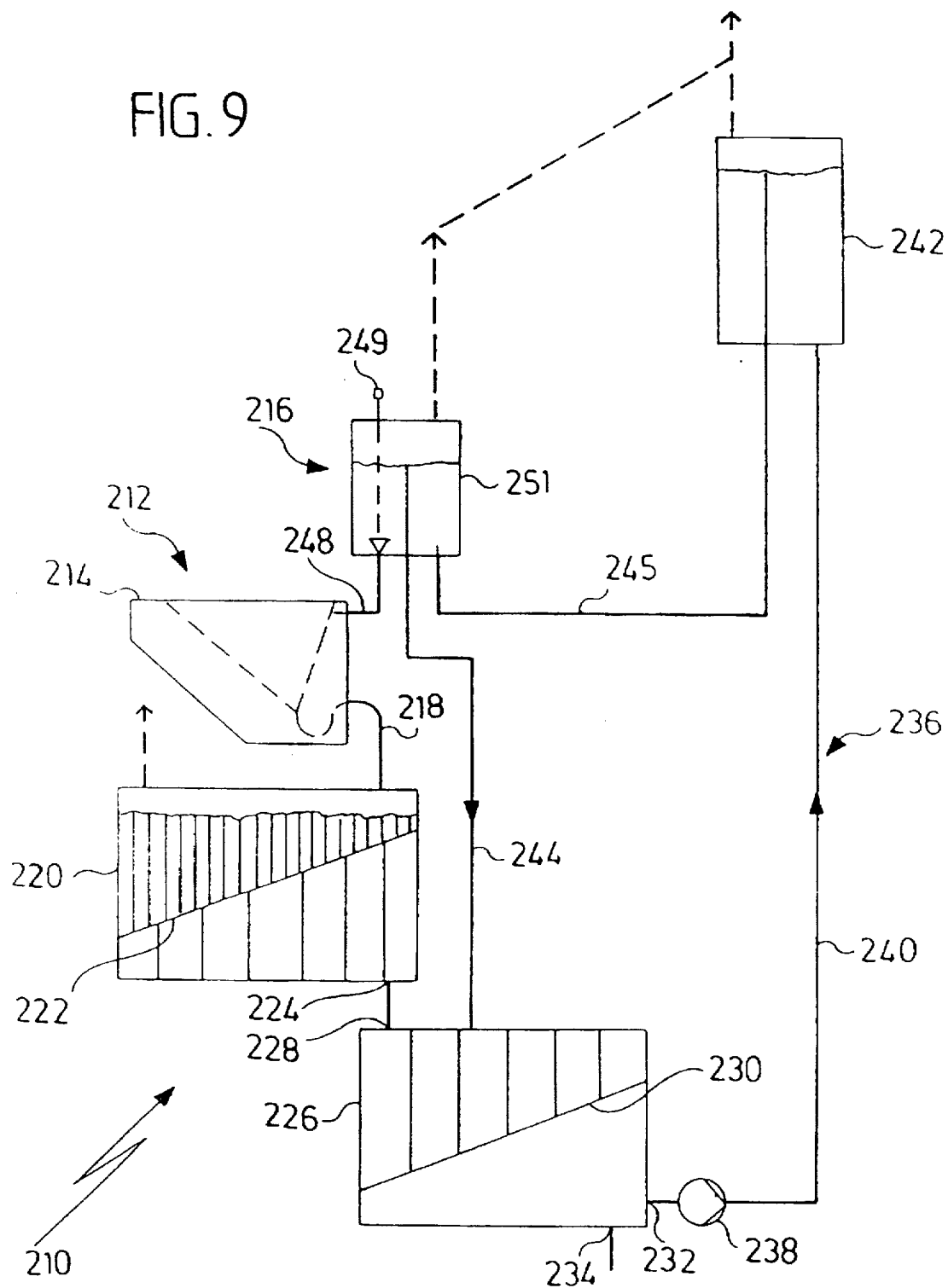
FIG. 9 is a diagrammatic representation of a variant of the toilet system according to FIG. 7 in which a second storage tank is provided for filling the flush box by means of a pressure head.

Finally, FIGS. 9 and 10 show two embodiments of the present invention wherein, in comparison with the embodiments of FIGS. 7 and 8, a further storage tank is provided for filling the flush box by means of a pressure head. FIG. 9 shows in detail a toilet system 210 with a toilet 212 comprising a toilet bowl 214 and a flushing device 216. The toilet 212 is connected through a sewage pipe 218 to a faecal tank 220 comprising a separating device 222 for separating liquid and solid components of the sewage. The liquid components of the sewage are made available as grey water at a first outlet 224 and travel through a grey water inlet 228 into a hygienization tank 226. The hygienization tank 226 contains a hygienization device 230 in which pathological germs are removed from the grey water which is then made available as hygienized grey water with an admissible germ count. The hygienized grey water is available at the second outlet 232. A further outlet 234 is provided on the hygienization tank 226 to enable it to be drained, when required, i.e., for example, for maintenance work.

At the second outlet 232, the hygienized grey water is received by a recirculating device 236 comprising a recirculating pump 238 and a return pipe 240. From the return pipe 240 the hygienized grey water travels into a storage tank 242 which supplies a flush box 251 through a pipe 245. The pipe 245 terminates inside the storage tank 242 at a level which corresponds to the set level of the tank 242. The flush box 251 is filled from below by the pipe 245, and the maximum level of the flush box 251 is determined by a return pipe 244 which is supplied by an overflow determining the set level of the flush box and leads into the hygienization tank 226 on the grey water side thereof.

Upon actuation of the actuating device 249, a surge of hygienized grey water is delivered as flushing liquid to the toilet bowl 214 to rinse off the faeces and convey them through the pipe 218 to the faecal tank 220. The cleaning of the sewage, i.e., the hygienized grey water including the rinsed off faeces, is carried out as described hereinabove.

In the same way as those described hereinabove, it is expedient for the present embodiment to have a storage tank which builds up a static pressure in combination with a recirculating pump 238 with a very low pumping capacity.

As hereinabove, a supplementary alternative to FIG. 9 is described in FIG. 10, wherein the basic design has remained the same, and, therefore, identical components of the toilet system 210a shown here have the same reference numerals, supplemented by the letter "a". A major difference, as mentioned hereinabove, is that the toilet system 210a is supplemented by a connection 254a to a supply of fresh water. With this toilet system 210a there is the possibility of reflushing with fresh water after a main flushing operation with hygienized grey water as flushing liquid, so that, as described hereinabove, the flushing effect achieved is fully identical with that after flushing with fresh water, but considerable amounts of fresh water can be saved.

In general, it should be noted that in each of the embodiments described in FIGS. 1–10, the faecal tanks and, if necessary, storage tanks and/or flush boxes conducting hygienized grey water are provided with a ventilation system. Where separate storage tanks and flush boxes are used, the ventilation systems of the storage tank and the flush box are preferably united and led jointly into the open air.

The arrangement of the recirculating pump in the recirculating device is not necessarily limited to the second outlet on the hygienized Grey water side of the hygienization tank. It could also be arranged between the first outlet and the grey water inlet, with corresponding measures being taken in the return pipe for returning the circulating hygienized grey water which leads into the part of the hygienization tank on the grey water side thereof.

The simplest construction is, however, to be seen in the arrangement of the recirculating pump on the outlet side in relation to the hygienization tank since the aforementioned problems do not arise in that case.

An additional effect of the recirculating pump of the recirculating device is that it promotes and accelerates the process of the hygienization of the grey water in the hygienization device. Micropore filters can, for example, be used here to allow water and constituents dissolved in it to pass through but to keep back pathogenic germs or the like. Of course, any other kind of hygienization of the grey water and its conversion to hygienized grey water could be used and applied to the individual embodiments of the invention, as it is not a question of the type of hygienization here, but of making appropriately hygienized, germ-free grey water available for the flushing operation.

The superior quality of the toilet system of the present invention is achieved by the stored hygienized grey water being recirculated continually or at least regularly so that even when the hygienized grey water is stored for longer periods of time, pathologically critical germ counts do not occur.

Furthermore, the return of the hygienized grey water from the recirculating device to the grey water area of the toilet system can terminate not only in the hygienization tank but just as well in the grey water side of the faecal tank. In principle, return through the sewage pipe leading from the toilet bowl to the faecal tank is also conceivable, but this would involve a constant throughput for the separating device in the faecal tank and, in particular, with high recirculating speeds, necessitate correspondingly larger dimensions for this separating device, which is not desirable.

We claim:

1. A toilet system comprising: a toilet including a flushing device and a toilet bowl; a faecal tank for receiving sewage from the toilet bowl, the faecal tank including (1) a sewage receiving side for receiving sewage from the toilet bowl, (2) a separating device for separating liquid and solid components of the sewage and transferring the liquid component of the sewage to a grey water side of the faecal tank, and (3) a first outlet for transferring grey water to a hygienization tank; the hygienization tank including (1) a grey water side with a grey water inlet for receiving the grey water from the faecal tank, (2) a device for hygienizing the grey water and transferring the hygienized grey water to a hygienized grey water side, and (3) a second outlet for withdrawing hygienized grey water from the hygienization tank; a grey water side of the toilet system including (1) the grey water side of the faecal tank, (2) the first outlet, (3) the grey water inlet, and (4) the grey water side of the hygienization tank; a recirculating device with a recirculating pump and a return pipe, the recirculating device connecting the second outlet with the grey water side of the system and with the flushing device and, as required, supplying the flushing device with amounts of the hygienized grey water as flushing liquid and wherein the recirculating device comprises a valve arrangement which is arranged downstream from the recirculating pump and through which the hygienized grey water required for flushing is withdrawable from the recirculating device.

2. Toilet system as defined in claim 1, characterized in that hygienized grey water is usable as flushing liquid in a first flushing phase and fresh water in a subsequent phase.

3. The toilet system of claim 1, wherein the flushing device comprises a device for pulsing delivery of the flushing liquid to the toilet bowl.

4. The toilet system of claim 1, wherein the flushing device is designed such that the flushing liquid is delivered to the toilet bowl in several flushing phases.

5. The toilet system of claim 1, wherein the flushing device comprises an electronic control means.

6. The toilet system of claim 1, wherein the valve arrangement comprises a multi-way valve.

7. The toilet system of claim 1, wherein the recirculating device comprises a pipe branching downstream from the recirculating pump, a first branch thereof being connected to the grey water side of the hygienization tank and a second branch thereof being connected to the flushing device.

8. Toilet system as defined in claim 7, characterized in that said pipe branching comprises a storage tank (142) generating a hydrostatic pressure, said storage tank comprising an inlet for said return pipe (136), an outlet connected to said grey water side of said hygienization tank (126) and an outlet connected to said flushing device (116).

9. Toilet system as defined in claim 8, characterized in that said storage tank (192) is simultaneously a flush box of said flushing device (166).

10. The toilet system of claim 1, wherein the system is an essentially closed circuit from which, if required, solids are withdrawn after having been separated off in the faecal tank.

11. Use of the toilet system of claim 1 for rail-bound vehicles, airplanes, and road-bound vehicles.

* * * * *